(12) United States Patent
Saito et al.

(10) Patent No.: US 6,397,901 B1
(45) Date of Patent: Jun. 4, 2002

(54) POWDER MATERIAL SUPPLY DEVICE FOR PRODUCING FUEL CELL SEPARATOR

(75) Inventors: Kazuo Saito; Atsushi Hagiwara; Takashi Maki, all of Chiba (JP)

(73) Assignee: Nisshinbo Industries, Inc, Tokyo (JP)

( * ) Notice: Subject to any disclaimer, the term of this patent is extended or adjusted under 35 U.S.C. 154(b) by 0 days.

(21) Appl. No.: 09/649,705

(22) Filed: Aug. 25, 2000

(30) Foreign Application Priority Data

Aug. 27, 1999 (JP) .......................................... 11-241508

(51) Int. Cl.⁷ ............................................... H01M 4/72
(52) U.S. Cl. ......................... 141/32; 141/238; 141/240
(58) Field of Search ........................... 141/71, 248, 247, 141/238, 240, 32; 222/425, 481, 565

(56) References Cited

U.S. PATENT DOCUMENTS

| | | | | |
|---|---|---|---|---|
| 1,139,269 A | * | 5/1915 | Goodman et al. | |
| 1,488,603 A | * | 4/1924 | Kouwenhoven | |
| 3,380,633 A | * | 4/1968 | Du Bois | |
| 3,718,164 A | * | 2/1973 | Stewart | 141/238 |
| 3,987,824 A | * | 10/1976 | Zehnder | 141/238 |
| 4,143,688 A | * | 3/1979 | Gill, Jr. et al. | |
| 4,383,010 A | * | 5/1983 | Spaepen | |
| 4,398,578 A | * | 8/1983 | Walters et al. | 141/238 |
| 5,093,214 A | * | 3/1992 | Saito et al. | |
| 6,127,059 A | * | 10/2000 | Kato | |

FOREIGN PATENT DOCUMENTS

| | | | |
|---|---|---|---|
| EP | 1035608 A2 | * | 9/2000 |
| JP | 0421072 A | * | 8/1992 |

* cited by examiner

*Primary Examiner*—Gregory Huson
*Assistant Examiner*—Khoa Huynh
(74) *Attorney, Agent, or Firm*—Muramatsu & Associates

(57) ABSTRACT

A powder material supply device is able to supply powder material to a mold system equally and accurately to produce a fuel cell separator of high surface accuracy, thereby producing a high performance fuel cell. The powder material supply device includes a material supplier which is provided with a plurality of supply openings in a downward direction, a slide plate provided at the lower part of the material supplier and is slidable between a location where all of the supply openings are closed and another location where all the supply openings are opened, and a base to support the material supplier and the slide plate. The base has a single opening with a size substantially corresponding to a size of all of the supply openings.

10 Claims, 5 Drawing Sheets

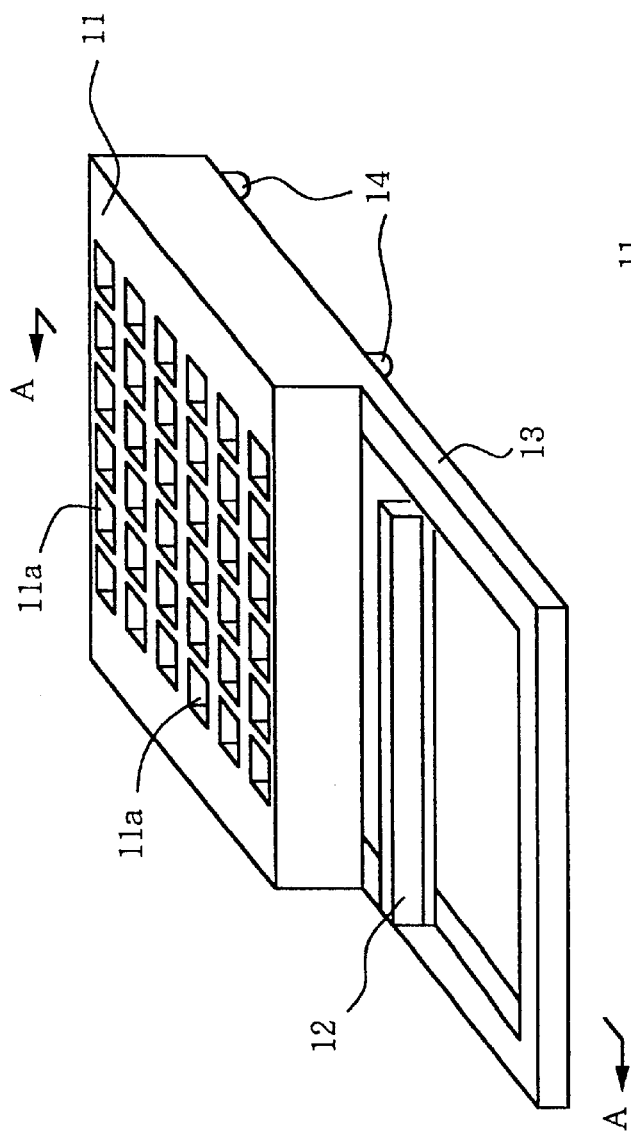
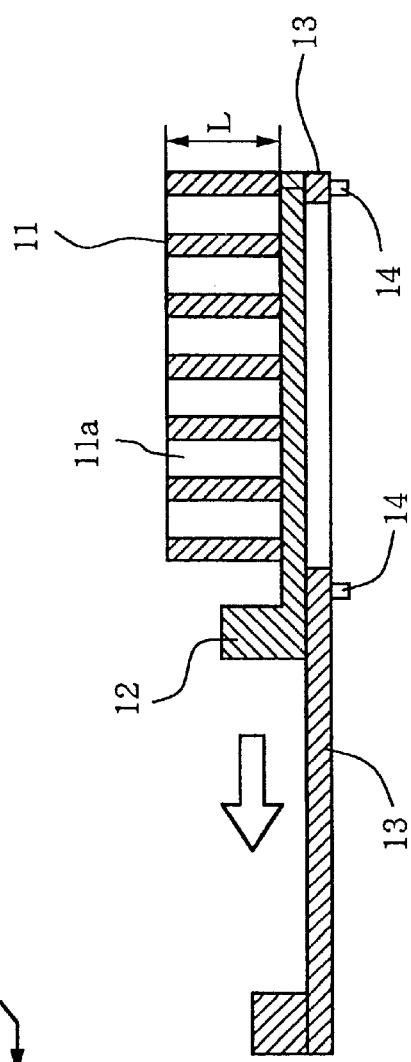
Fig. 1(a)
Fig. 1(b)

POWDER MATERIAL SUPPLY DEVICE FOR PRODUCING FUEL CELL SEPARATOR

FIELD OF THE INVENTION

This invention relates to a powder material supply device which is used for producing a predetermined form of objects by supplying powder material to a mold system. This invention also relates to a production method of a fuel cell separator and a fuel cell separator produced by this production method using the powder material supply device. Here, the term "powder material" generally refers to material in the forms of powder, particle and/or short fiber.

BACKGROUND OF THE INVENTION

A fuel cell which generates electric power by making use of fuel gas and oxidant gas, especially a solid polymer type fuel cell, is considered to be a new clean energy source in various applications including automobiles. A solid polymer fuel cell is configured in such a way that an ion conductive solid electrolyte membrane is sandwiched by an anode and a cathode each having a catalyst and functioning as a gas diffusion electrode, and an outside of each electrode is further provided with a fuel cell separator. The separator at the anode provides hydrogen as fuel gas, and the separator at the cathode provides oxygen as oxidizer gas.

FIGS. 5(a) and 5(b) show an example of such a fuel cell separator. As shown in FIGS. 5(a) and 5(b), on a fuel cell separator 1, narrow grooves 1a are formed on a planar surface thereof. In order to increase an overall surface area for contacting between the gas diffusion electrode and the gas, the grooves 1a are meandering with a small pitch on the whole surface of the separator. The grooves 1a may be formed on both surfaces of the separator as shown in FIG. 5(b), or may be formed only on one surface of the separator.

There are other types of structures of the separator wherein both surfaces or one surface is provided with a large number of projections where spaces between those projections are used as passages of the gas, or both surfaces or one surface is provided with combinations of such projections and grooves.

In the fuel cell separator described above, the following characteristics are required.

(1) Gas non-permeability. This is a characteristic not to allow the hydrogen gas and/or oxygen gas supplied thereto to permeate through the separator. Generally, a fuel cell is formed of many cell units stacked together where each cell unit includes a solid polymer electrolyte membrane at the center, gas diffusion electrodes at both outer sides of the electrolyte membrane, and the separators further outside of both of the electrodes. The gas is flowing at least one side of a separator. Therefore, if the separator has gas permeability or leakage, an overall efficiency of power generation by the fuel cell decreases, or the power generation itself cannot be performed.

(2) Electric conductivity. Because the separator also acts as an electrode of the fuel cell, electric conductivity is an essential requirement.

(3) High surface or thickness accuracy. Because electric current flows through the contact area between the separator and the anode or cathode, insufficient surface accuracy, i.e, profile irregularity, deteriorates electric conductivity due to the insufficient contact area. Moreover, when the surface accuracy is insufficient, gaps may be formed between the anode and the cathode, which may cause breakage of the separator when a force is applied to the separator in such a direction to press the gaps. When the surface accuracy is high, the contact resistance is small, resulting in improvement of the fuel cell performance. The surface accuracy is represented by a difference d between the maximum thickness $T_{max}$ and the minimum thickness $T_{min}$ by measuring the thickness at predetermined points on the separator.

In order to satisfy the requirements noted above, in the conventional technology, the fuel cell separator is produced through a mechanical process such as machine works on a graphite board. However, due to the long processing time, the fuel cell separator becomes too expensive.

Recently, a production method using a mold technology has been employed for the purpose of producing the fuel cell separators. In this conventional method, powder material is formed by mixing carbon powder in the form of powder and/or short fiber and synthesis resin powder. The resultant powder material is supplied to a lower mold of a mold system such as a press machine which is then covered by an upper mold of the mold system. The fuel cell separator is formed by pressing the powder material by the press machine in the high temperature condition.

However, the conventional production method using the mold technology described above has a problem in that it is difficult to achieve the sufficient level of surface accuracy of the separator. For example, in this conventional production method, the difference d of the thickness described above tends to be 0.2 mm or more, thereby limiting the performance of the fuel cell.

SUMMARY OF THE INVENTION

The present invention reflects on the aforementioned facts, and aims to provide a fuel cell separator which is able to achieve the surface accuracy higher than that of the conventional technology, a production method of the fuel cell separator, and a powder material supply device suited for the production method.

In order to achieve the objectives above, the powder material supply device of the present invention is characterized in having a material supplier which is provided with a plurality of supply openings in a downward direction, a slide plate provided at the lower part of the material supplier and is capable of slidably moving between a location where all of the supply openings are closed and another location where all the supply openings are opened, and a base to support the material supplier and the slide plate.

The material supplier has a predetermined constant thickness or height, thereby forming the same capacity for each and every supply opening formed thereon. Preferably, engagement means are provided on the powder material supply device for accurately positioning the powder material supply device on a mold system, such as a lower mold to which the powder material is supplied. The supply openings are aligned on the material supplier equally and accurately in, for example, a matrix manner.

The production method of the present invention in which a fuel cell separator is formed by supplying the powder material to a lower mold and applying pressure and heat between the upper mold and the lower mold, is characterized in that the powder material for the fuel cell separator is supplied through a plurality of supply openings.

Further, the production method of the present invention in which a fuel cell separator is formed by supplying the powder material to the lower mold and applying pressure and heat between the upper mold and the lower mold, is characterized in that the powder material supply device having either one slide plate or two slide plates are used for supplying the powder material to the lower mold.

The fuel cell separator of the present invention is characterized as having a surface accuracy of less than 0.07 mm wherein the material of the fuel cell separator is a mixture of carbon powder and synthetic resin powder and the size of the separator is more than 200 mm by 200 mm.

BRIEF DESCRIPTION OF THE DRAWINGS

FIG. 1 shows the powder material supply device in the first embodiment of the present invention where FIG. 1(a) is a perspective view thereof and FIG. 1(b) is a cross section view taken along the A—A line of FIG. 1(a).

FIG. 5 shows an example of fuel cell separator where

DETAILED DESCRIPTION OF PREFERRED EMBODIMENTS

Figure 2:
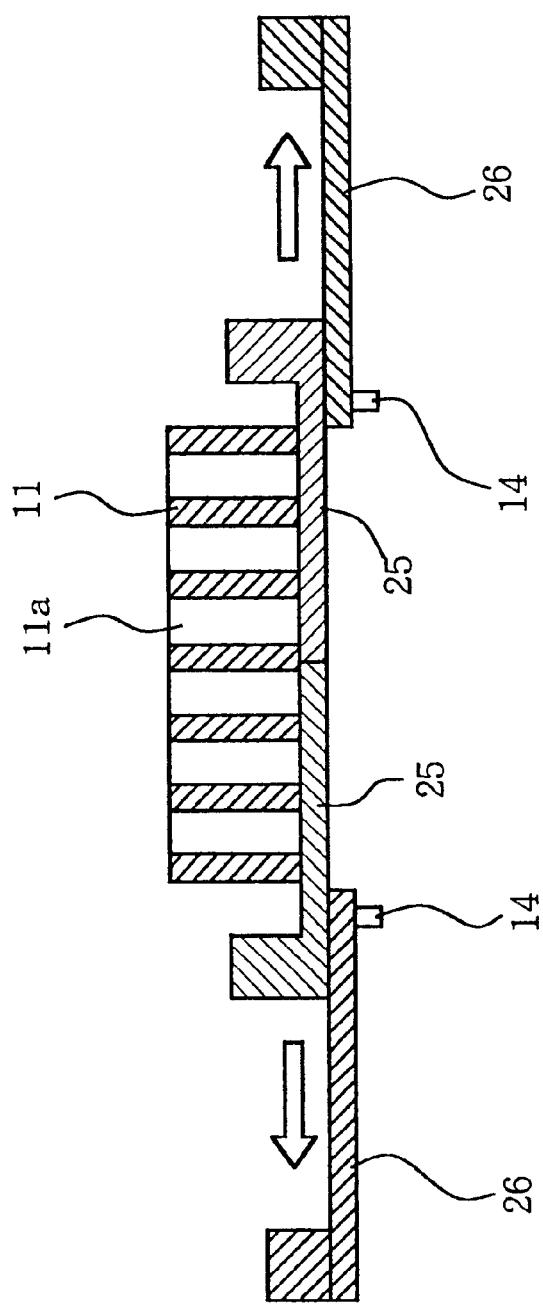
FIG. 2 is a cross sectional view of the powder material supply device in the second embodiment of the present invention.

The embodiments of the present invention are explained in detail with reference to the accompanying drawings. FIG. 1 shows an example of the powder material supply device of the present invention wherein FIG. 1(a) is a perspective view thereof and FIG. 1(b) is a cross section view taken along the line A—A of FIG. 1(a).

As shown in FIGS. 1(a) and 1(b), the powder material supply device of the present invention is comprised of a material supplier (charger) 11, a slide plate 12 provided under the material supplier 11, and a base 13.

On the material supplier 11, a large number of supply openings 11a are aligned in a matrix manner with a constant and accurate spacing. Each supply opening 11a penetrates through the material supplier 11 perpendicularly, and the lower end (bottom) of the opening 11a is opened. Since the material supplier 11 has a constant thickness L throughout, each supply opening 11a has a predetermined capacity identical to one another.

In this example, the base 13 is integrally configured with the material supplier 11. However, as shown in FIG. 1(b), the base 13 has a large opening right under the material supplier 11. There is a space between the base 13 and the material supplier 11, and the slide plate 12 is slidably provided in the space.

The slide plate 12 can slide along the space between the base 13 and the material supplier 11 in such a way that it completely closes the bottom of the supply openings 11a of the material supplier 11 as shown in FIG. 1(b) or it completely opens all of the bottoms of the supply openings 11a of the material supplier 11 when moving in the direction shown by the arrow of FIG. 1(b).

On the base 13, engagement means such as a plurality of engagement projections 14 are provided at, for example, the bottom corners thereof. The engagement projections 14 fit in receptacles (not shown) on the predetermined positions of the lower mold, thereby accurately positioning the powder material supply device relative to the mold system. Any other types of engagement means, such as grooves, hooks, screws, and etc. are also possible.

FIG. 2 is another embodiment of the powder material supply device in the present invention. In this example, the material supplier 11 and the supply openings 11a are identical to those in the embodiment of FIG. 1. However, this embodiment is characterized in that two slide plates 25 are employed which meet at the center of the space formed between the material supplier 11 and the base 13 and slidably move in the directions opposite to each other. Since the slide plates 25 move toward both sides, the base 26 is also extended toward the both sides.

Figure 3A:
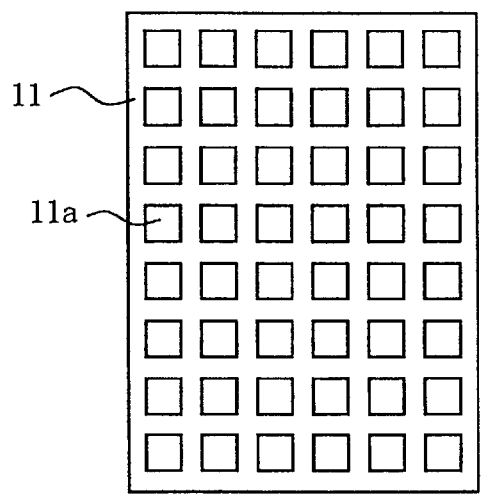
FIGS. 3(a), 3(b) and, 3(c) are top views of the powder material supply device of the present invention showing various shapes of supply openings.
Figure 3B:
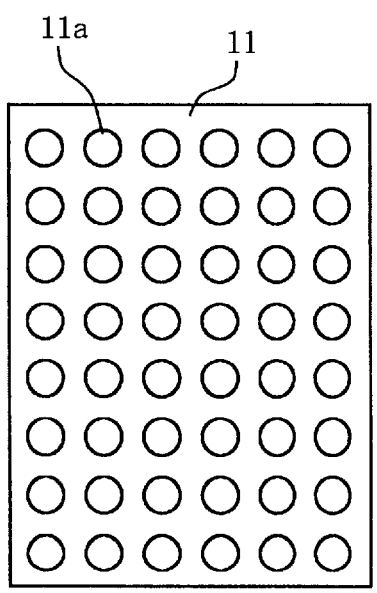
Figure 3C:
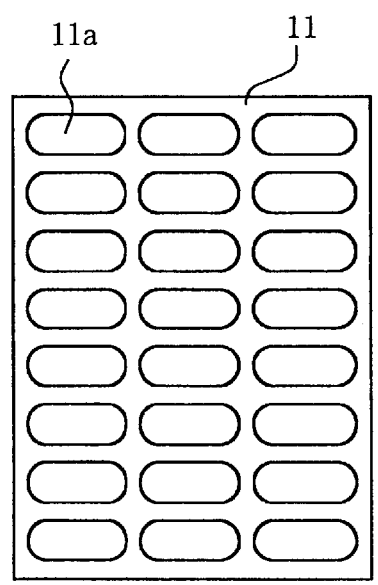

FIGS. 3(a)–3(c) show examples of supply openings 11a on the material supplier 11. The supply openings in FIG. 3(a) have a square shape, and the supply openings in FIG. 3(b) have a circular shape, and the supply openings in FIG. 3(c) have an ecliptic shape. The shape of the supply openings are not limited to the above examples, and can take various other forms such as triangular, polygonal, curved, and/or guitar shapes.

Referring to FIG. 4, the operation of the powder material supply device of the present invention, and accordingly, a production method of the fuel cell separator of the present invention is explained in the following.

An example of powder material for the fuel cell separator is prepared by mixing powder of graphite scales (average diameter: 30 $\mu$m) and phenol resin with a weight ratio of between about 100:11 and 100:45, preferably about 100:25.

Figure 4A:
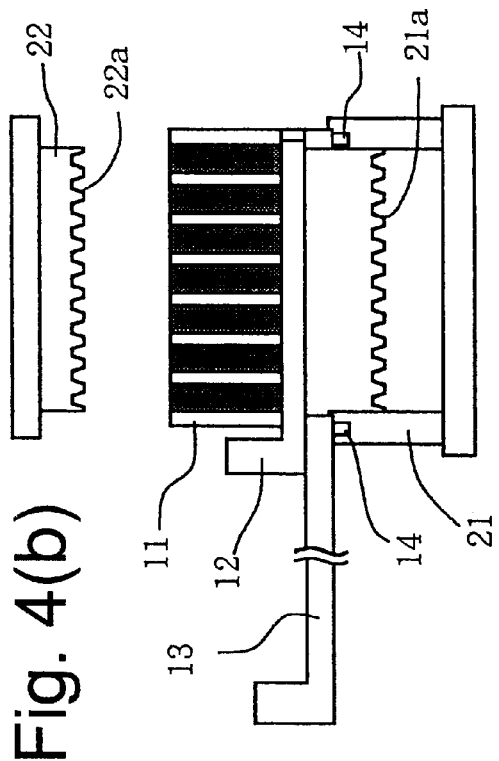
FIGS. 4(a)–4(d) are cross sectional diagrams showing a process of producing a fuel cell separator using the powder material supply device of the present invention.

In FIG. 4(a), the powder material thus formulated is charged in each supply opening 11a of the material supplier 11. A flattening rod 15 may be applied in the direction of the arrow on the surface of the material supplier 11 to remove the excessive powder material over the supply openings 11a. Thus, the powder material of the same and predetermined quantity is filled in each supply opening 11a. In the experiment, two (2) kinds of the supply openings 11a, a square shape with width of 16 mm and a circular shape with diameter of 16 mm, are prepared. In each kind of the supply openings 11a, a distance between the supply openings 11a is 3 mm. The supply openings 11a are aligned in twenty (20) in the row and ten (10) in the column, with a total number of two hundreds.

Figure 4B:
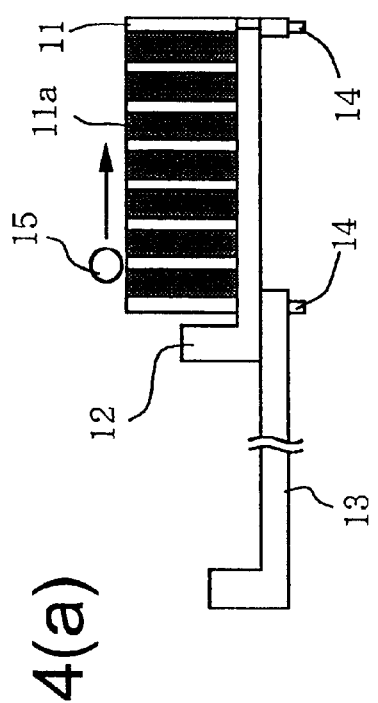

The powder material supply device filled with the powder material is set on a lower mold 21 of a press machine as shown in FIG. 4(b). Since the lower mold 21 includes receptacles to couple with the engagement means such as the engagement projections 14 on the bottom of the base 13 (FIGS. 1(a) and 1(b)), accurate positioning between the powder material supply device and the lower mold 21 can be easily and quickly achieved. A pattern 21a for a lower surface of the fuel cell separator is formed on the lower mold 21, while a pattern 22a for an upper surface of the fuel cell separator is formed on an upper mold 22.

Figure 4C:
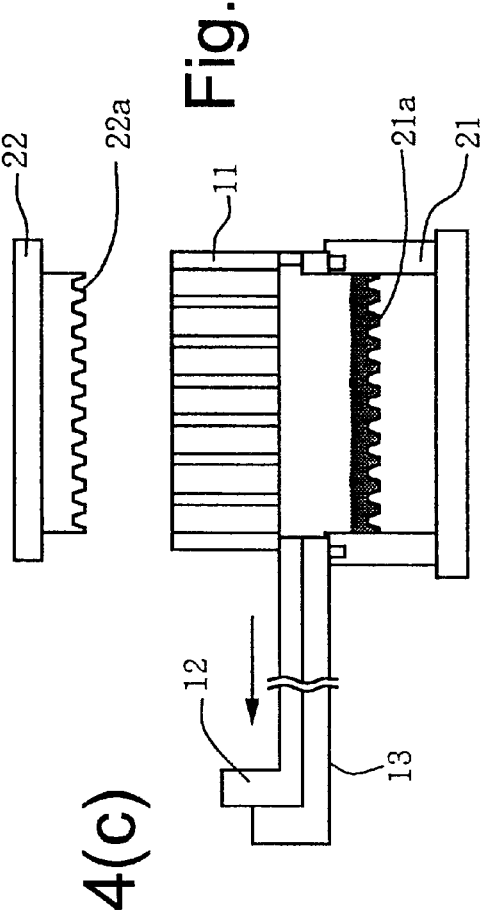

In FIG. 4(c), the slide plate 12 is pulled in the direction of the arrow until being stopped by the end of the base 13. Since all the bottom of the supply openings 11a are opened, the powder material filled in the supply openings 11a falls on the pattern 21a on the lower mold 21. Because the plurality of the supply openings 11a are regularly and accurately aligned in a matrix manner and thus the same amount of powder material has been filled in each supply opening 11a, the powder material provided onto the lower mold 21 is distributed evenly, eliminating any unevenness of the material thickness.

Figure 4D:
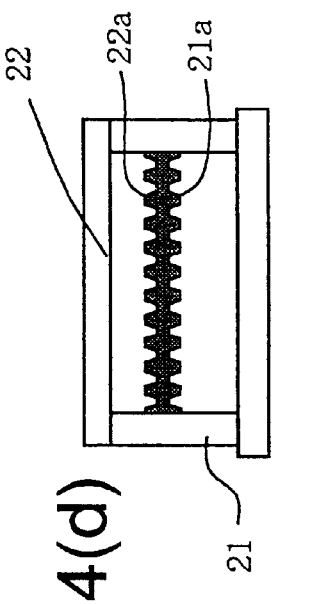
Figure 5A:
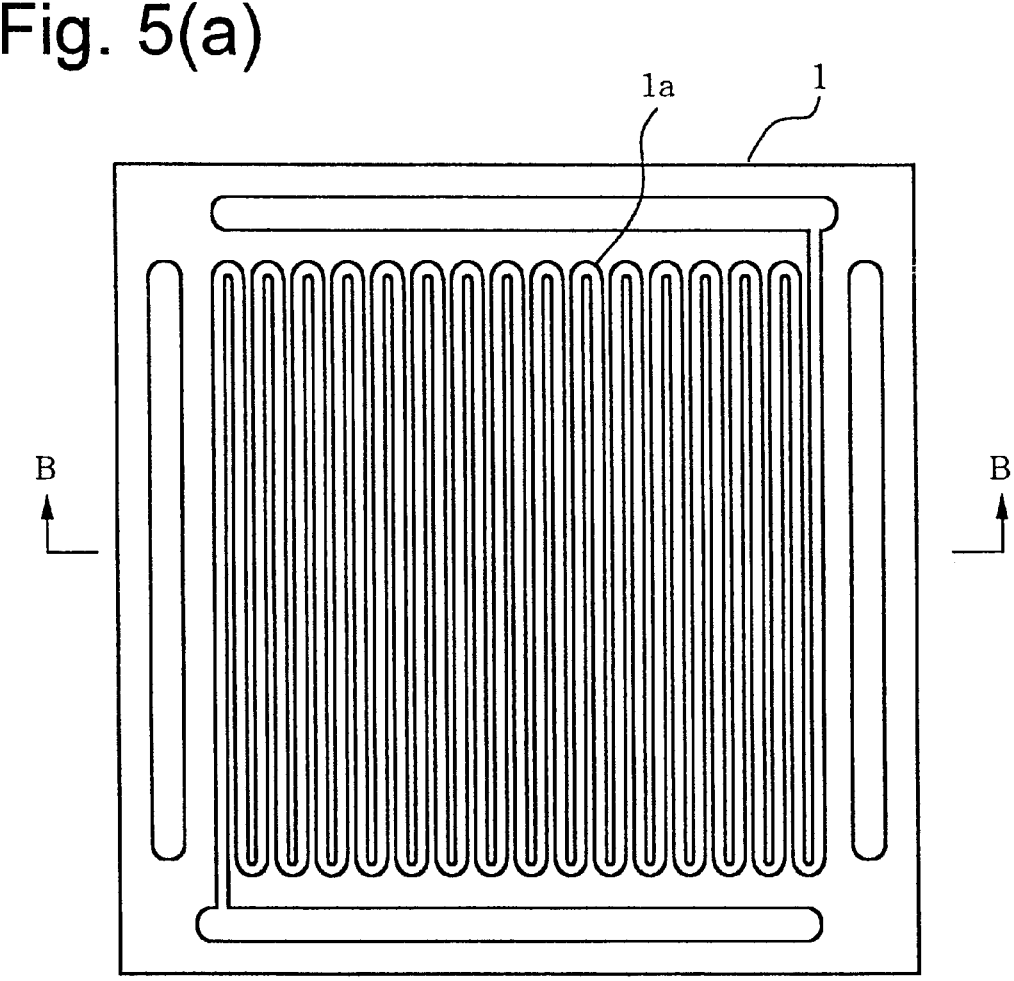
FIG. 5(a) is a plan view thereof and FIG. 5(b) is a cross sectional view taken along the B—B line of FIG. 5(a).
Figure 5B:
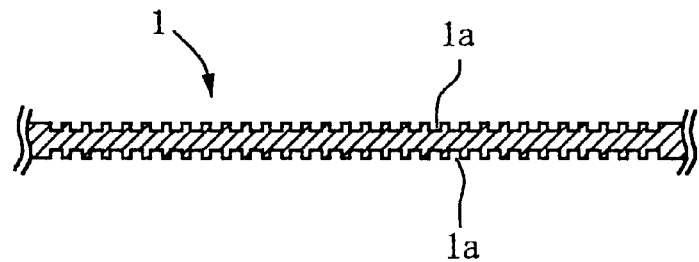

Then, as shown in FIG. 4(d), the upper mold 22 is placed on the lower mold 21, and a fuel cell separator with a size of 400 mm×200 mm is produced in the mold temperature of 160 degrees centigrade and molding pressure of 200 kg/cm2, and with the molding time of 5 minuets. The thickness is measured at predetermined forty (40) points of the fuel cell separator produced in the foregoing. The difference d between the maximum thickness $T_{max}$ and the minimum thickness $T_{min}$, that is, $d=T_{max}-T_{min}$, is calculated.

TABLE 1

|  | Shape of Openings | Supply Device Type | $d = T_{max} - T_{min}$ |
|---|---|---|---|
| Sample 1 | 16 mm square | Type 1 | 0.05 mm |
| Sample 2 | 16 mm square | Type 2 | 0.06 mm |
| Sample 3 | 16 mm circle | Type 1 | 0.06 mm |
| Sample 4 | 16 mm circle | Type 2 | 0.07 mm |
| Prior Art |  |  | 0.3 mm |

The results of the experiment is summarized in Table 1 above. A sample 1 in Table 1 is a powder material supply device having square shaped supply openings 11a of 16 mm in width and with the single-side slide type of FIG. 1 (type 1). A sample 2 is a powder material supply device having the identical conditions as that in the sample 1 except that it uses the double-side slide type shown in FIG. 2 (type 2). A sample 3 is a powder material supply device of type 1 and has circular shaped supply openings 11a of 16 mm in diameter. A sample 4 is a powder material supply device of type 2 and has circular shaped supply openings 11a of 16 mm in diameter.

Table 1 also shows the data involving the prior art example, using the same powder material as used in the examples 1–4 described above but without using the powder material supply device of the present invention. Thus, in the prior art example, the powder material is directly filled in the lower mold. All the other conditions including the molding pressure, temperature and the molding time are the same among the examples 1–4 as well as the prior art example. The fuel cell separators of the identical outer size are formed, and the thickness of each separator is measured at 40 points as noted above. The difference d between the maximum thickness $T_{max}$ and the minimum thickness $T_{min}$, that is, $d=T_{max}-T_{min}$, for each fuel cell separator is calculated and listed in Table 1.

As apparent from the data in Table 1, although the unevenness of thickness which is expressed by the difference d is 0.3 mm in the prior art, the unevenness is improved to less than 0.07 mm when using the powder material supply device of the present invention.

In the powder material supply device of the present invention, by adjusting the number of the supply openings depending on the size of the fuel cell separator, various sizes of fuel cell separator, from a small surface area to a large surface area, can be produced with high surface accuracy or thickness accuracy. Therefore, a fuel cell separator larger than 200 mm by 200 mm, which has been difficult to produce under the conventional technology, can be easily achieved with the surface unevenness of less than 0.07 mm.

The application of the powder material supply device of the present invention is not limited to the production of the fuel cell separator. The present invention can be applied to anything that requires to evenly distribute powder material into a mold.

As described in the forgoing, the powder material supply device of the present invention can distribute the powder material equally and accurately to the mold due to the configuration comprising the material supplier having the plurality of supply openings in the downward directions, the slide plate which is slidable between the positions where all the supply openings are closed and where all the openings are opened, and the base for supporting the slide plate and the material supplier. Thus, the unevenness of the thickness of the separator can be minimized.

Since the material supplier has the same predetermined height and shape of the supply openings, the amount of powder material in each supply opening is identical to one another, thereby minimizing the unevenness of thickness of the final products formed through the mold process of the present invention.

Further, since the engagement projections for positioning the powder material supply device with respect to the mold are provided to fit in the receptacles on the mold, the powder material supply device of the present invention can be accurately positioned on the press mold.

In the fuel cell separator formed through the mold process using the powder material supply device of the present invention, the unevenness of the thickness of the separator is minimized. Thus, the resistance between the fuel cell separator and the gas diffusion electrode can be decreased, thereby increasing the overall efficiency of power generation in the fuel cell.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A powder material supply device for producing a fuel cell separator by supplying powder material to a mold system, comprising:

a material supplier which is provided with a plurality of supply openings in a downward direction for downwardly supplying powder material;

a slide plate provided at a lower portion of the material supplier and is slidable between a first location where all of the supply openings are closed and second location where all the supply openings are opened, and;

a base for supporting the material supplier and the slide plate and is provided with an engagement means for accurately positioning the powder material supply device on the mold system, wherein said base has a single opening substantially corresponding to all of said supply openings.

2. A powder material supply device for producing a fuel cell separator as defined in claim 1, wherein said slide plate is comprised of a single plate which is slidable in a horizontal direction between said first location and said second location.

3. A powder material supply device for producing a fuel cell separator as defined in claim 1, wherein said slide plate is comprised of two plates each being slidable in a horizontal direction which is opposite to each other between said first location and said second location.

4. A powder material supply device for producing a fuel cell separator as defined in claim 1, wherein said material supplier has a predetermined constant thickness, thereby forming the same capacity for each and every supply opening formed on said material supplier.

5. A powder material supply device for producing a fuel cell separator as defined in claim 1, wherein said engagement means on said base is formed of at least one projection to fit with a receptacle provided on the mold system to which the powder material is supplied.

6. A powder material supply device for producing a fuel cell separator as defined in claim 1, wherein said supply openings are aligned on the material supplier equally and accurately in a matrix manner.

7. A powder material supply device for producing a fuel cell separator as defined in claim 1, wherein said supply openings are aligned on the material supplier equally and accurately in a matrix manner and wherein each of said supply openings has a shape and size identical to one another.

8. A powder material supply device for producing a fuel cell separator as defined in claim 1, wherein said powder material is material for forming a separator of a fuel cell.

9. A powder material supply device for producing a fuel cell separator as defined in claim 1, wherein said powder material is a mixture of carbon and synthetic resin in forms of powder, particle and/or short fiber with weight ratio between about 100:11 and 100:45 for forming a separator of a fuel cell.

10. A powder material supply device for producing a fuel cell separator as defined in claim 1, wherein said powder material is a mixture of carbon and synthetic resin in forms of powder, particle and/or short fiber with weight ratio of about 100:25 for forming a separator of a fuel cell.

* * * * *